(12) United States Patent
Brabek

(10) Patent No.: US 6,928,921 B2
(45) Date of Patent: Aug. 16, 2005

(54) PISTON BORE

(75) Inventor: Walter Brabek, Jennersdorf (AT)

(73) Assignee: Verdichter Oe Ges.m.b.H., Fürstenfeld (AT)

( * ) Notice: Subject to any disclaimer, the term of this patent is extended or adjusted under 35 U.S.C. 154(b) by 77 days.

(21) Appl. No.: 10/332,113

(22) PCT Filed: Jul. 3, 2001

(86) PCT No.: PCT/AT01/00217
§ 371 (c)(1),
(2), (4) Date: Jan. 3, 2003

(87) PCT Pub. No.: WO02/02944
PCT Pub. Date: Jan. 10, 2002

(65) Prior Publication Data
US 2004/0025686 A1 Feb. 12, 2004

(30) Foreign Application Priority Data
Jul. 3, 2000 (AT) ..................... A 1137/2000

(51) Int. Cl.[7] ................................ F01B 31/10
(52) U.S. Cl. ................ 92/158; 92/174; 92/208
(58) Field of Search .............. 92/158, 159, 174, 92/193.6, 234, 208; 123/193.6, 234

(56) References Cited

U.S. PATENT DOCUMENTS

| | | |
|---|---|---|
| 2,863,707 A | 12/1958 | Lengnick |
| 4,350,083 A | 9/1982 | Gannaway |
| 4,809,591 A | 3/1989 | Rhodes |
| 4,817,505 A | 4/1989 | Rhodes |
| 4,903,580 A | 2/1990 | Bruni |
| 5,074,264 A * | 12/1991 | Mielke ............... 123/193.6 |
| 5,172,626 A * | 12/1992 | Hart ...................... 92/177 |
| 5,713,262 A * | 2/1998 | Sugiyama et al. ..... 92/158 |

FOREIGN PATENT DOCUMENTS

| | | |
|---|---|---|
| DE | 3432369 | 3/1985 |
| DE | 4109160 | 9/1992 |
| EP | 0072228 | 2/1983 |
| EP | 0373516 | 6/1990 |
| EP | 0780572 | 6/1997 |
| FR | 2076799 | 10/1997 |

* cited by examiner

Primary Examiner—Hoang Nguyen
(74) Attorney, Agent, or Firm—Collard & Roe, P.C.

(57) ABSTRACT

A piston for a compressor for use in hermetically encapsulated small-type refrigerating machines, with a cylinder-jacket-like sealing and guide surface section (1a, 2) as well as at least two substantially bridge- and cylinder-jacket-sector-like sealing and guide surface sections (6) of the piston skirt allowing the guidance of the piston in the cylinder as well as sealing the crankcase relative to the sealing or compression chamber and other sections of the piston skirt comprising a recess (3, 7). In order to provide a piston which despite being partially led out from the cylinder housing during a working stroke can easily be re-introduced into the same, wherein nevertheless friction- and weight-reducing recesses are provided on the piston skirt and a sufficient guidance of the piston is guaranteed, it is provided that the angle ($\alpha$) between the connecting lines of the boundary edges (9a, 9b) of each bridge-like and cylinder-jacket-sector-like sealing and guide surface section (6), which boundary edges extend in the axial direction of the piston, is smaller than 40°, preferably smaller than 30° with the associated rotational axis (8).

8 Claims, 4 Drawing Sheets

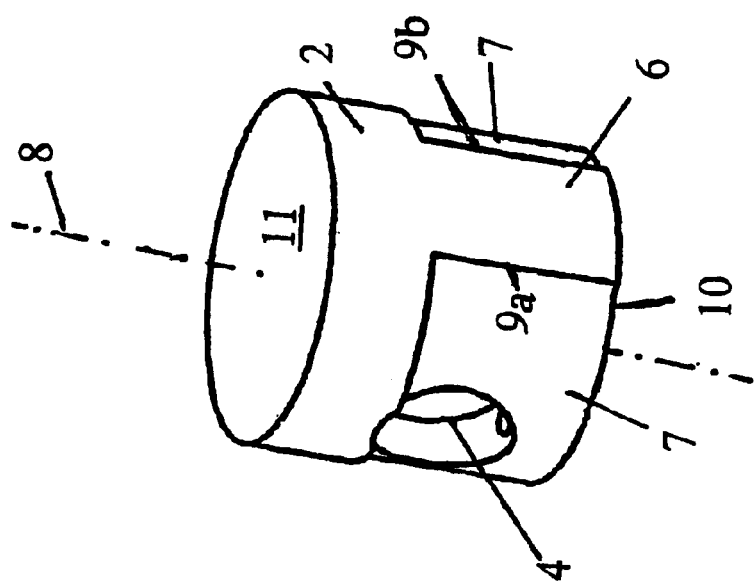
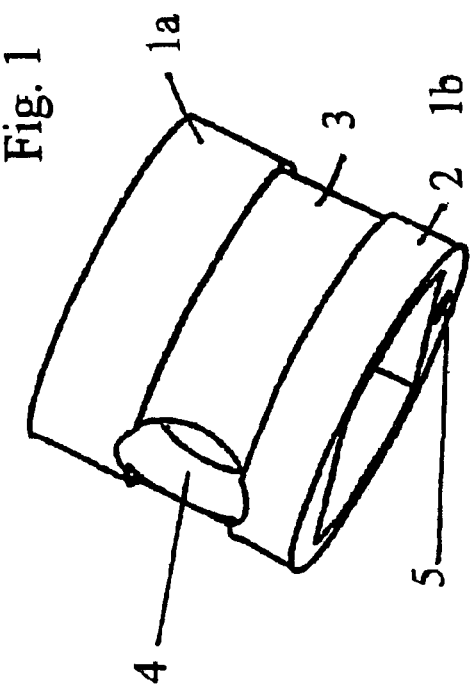

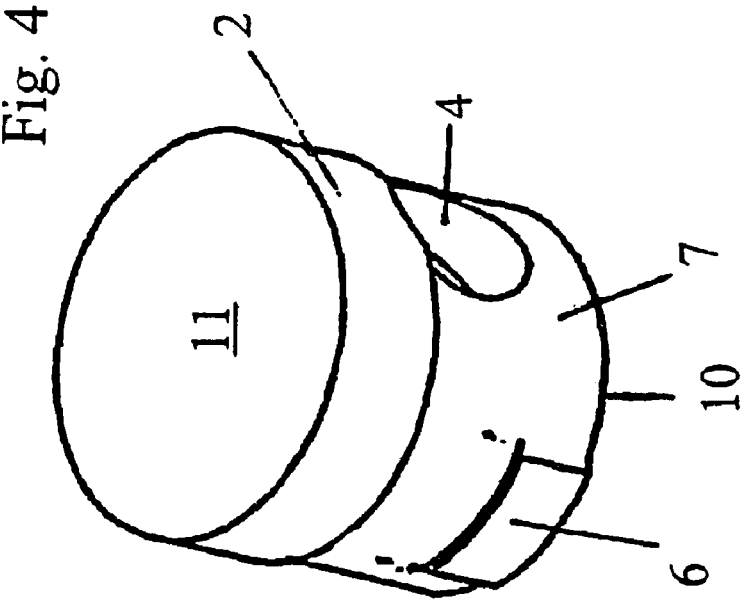
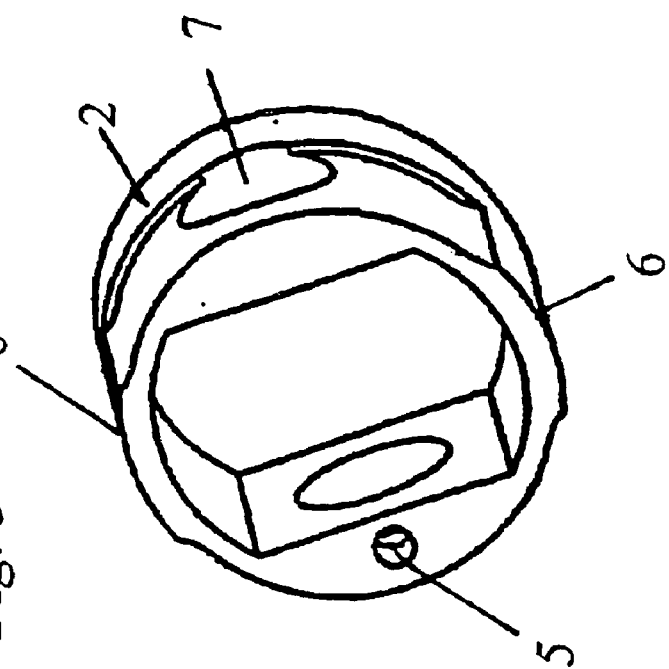

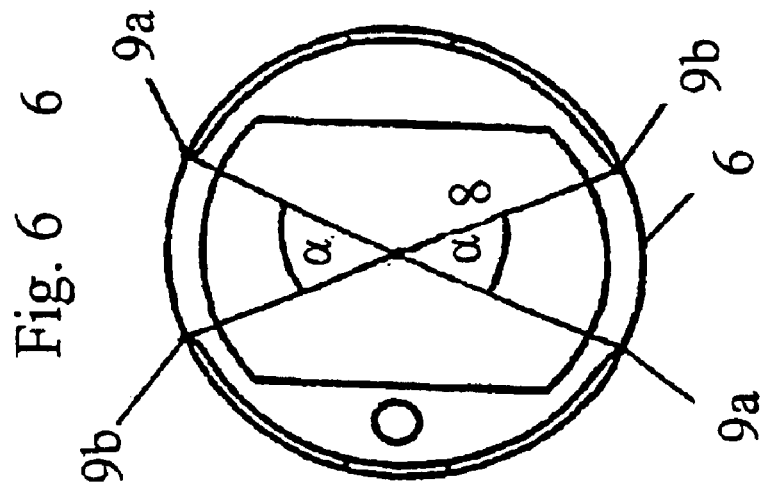
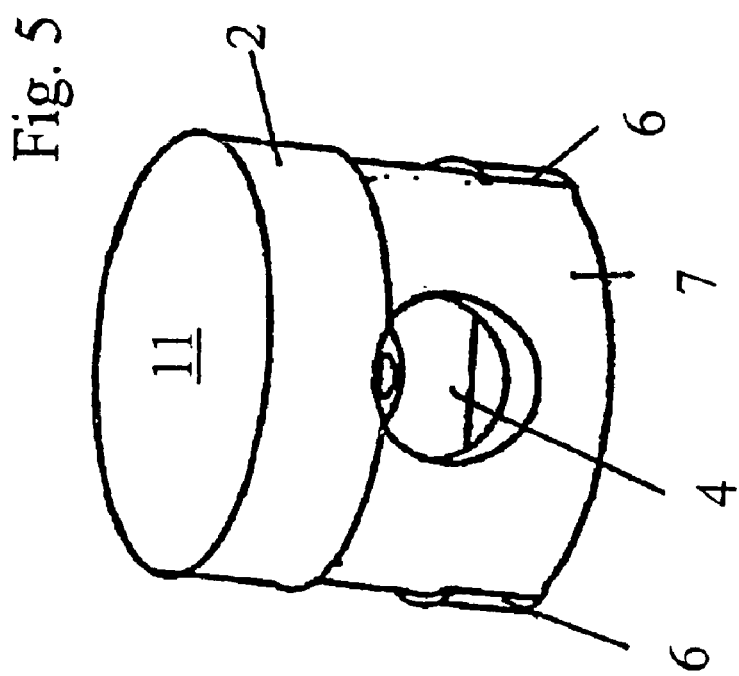

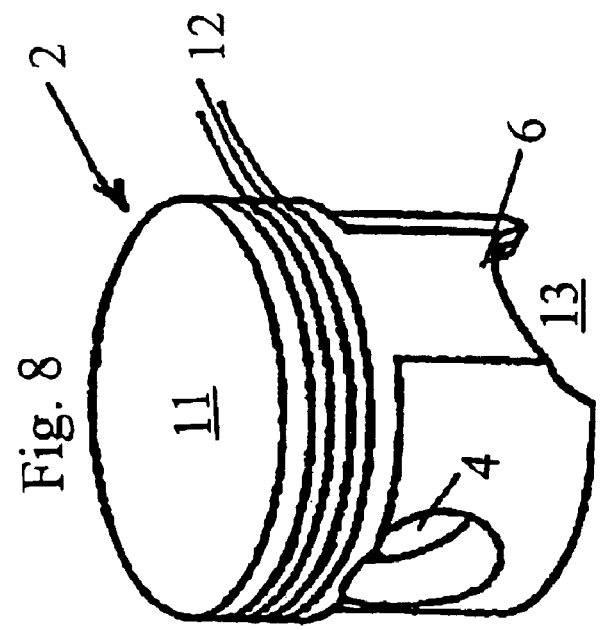
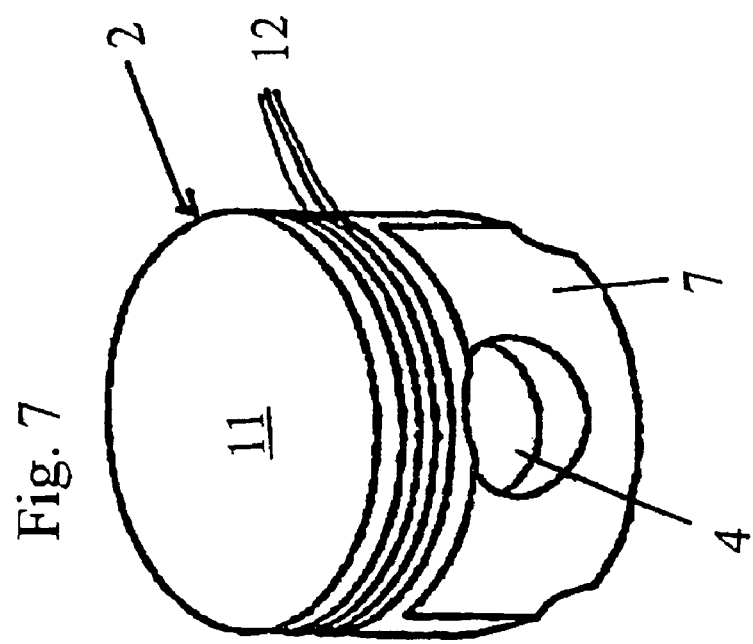

PISTON BORE

CROSS REFERENCE TO RELATED APPLICATIONS

Applicants claim priority under 35 U.S.C. §119 of AUSTRIAN Application No. A 1137/2000 filed on 3 Jul. 2000. Applicants also claim priority under 35 U.S.C. §365 of PCT/AT01/00217 filed on 3 Jul. 2001. The international application under PCT article 21(2) was not published in English.

The present invention relates to a piston for a compressor for use in hermetically encapsulated small-type refrigerating machines according to the preamble of claim 1.

The piston of a compressor usually has the task of compressing a working medium. The piston performs a reciprocating movement in a cylinder, with the piston skirt occluding in a substantially sealed manner with the cylinder jacket surface. It thus assumes both guiding as well as sealing tasks.

The friction of the two jacket surfaces on each other leads to an increased expenditure of energy which the piston needs to exert, thus reducing the overall efficiency of the entire compressor. It is therefore common practice in pistons according to the state of the art to provide recesses on the piston skirt, so that merely a certain section of the piston skirt will touch the cylinder wall. In this respect, the piston skirt comprises in the zone of the recesses a smaller distance from the piston axis than the region in which the piston skirt occludes in a sealing fashion with the cylinder walls. The recesses are so deep that supportive oil film can no longer be formed. Friction can therefore be strongly reduced. Moreover, the entire piston will become lighter, which also increases the efficiency of the compressor.

Known pistons for compressors according to the state of the art comprise a sealing and guide surface section in the zone of the piston head which is arranged in a cylinder-jacket-like fashion and occludes with the cylinder wall in a substantially sealing fashion over the entire circumference of the piston. The extension of said section in the direction of movement of the piston is chosen in such a way that a sufficient sealing with respect to the working medium is given. In addition, such pistons according to the state of the art comprise a second cylinder-jacket-like sealing and guide surface section which is arranged in the other end region of the piston skirt and again occludes with the cylinder jacket surface in a substantially sealing fashion over the entire circumference of the piston. As a result, an also cylinder-jacket-like recess remains between the two sealing and guide surface sections.

In the case of a configuration of the piston skirt as in the state of the art, there is a problem in the respect that at the lower dead centre of the piston an unthreading may occur of said additional sealing and guide section from the cylinder. In order to reduce the weight of the entire compressor, the cylinder housing is only arranged with such a length as is required by the stroke of the piston. In the process, the piston moves a bit out of the cylinder at the lower dead centre. The shorter the cylinder housing, the larger the savings in weight and material and the further the piston will move out of the cylinder at the lower dead centre, however.

In the case of pistons for compressors according to the state of the art there is a limit which is set by the height of the second cylinder-jacket-like sealing and guide surface section. The piston cannot be moved any further out of the cylinder, because in the zone of the recess there can no longer be any further guidance of the piston, as a result of which the same would tilt away laterally and the threading of the lower sealing and guide surface section on the piston into the cylinder would no longer be possible. An extension of the height of the second cylinder-jacket-like sealing and guide surface section would unnecessarily increase the friction and the weight.

From U.S. Pat. No. 4,350,083 a piston is further known which is provided with openings on the piston skirt in order to reduce wear and tear. They are provided with such a small arrangement with respect to surface area that a noticeable reduction of friction and thus savings in energy do not occur.

It is therefore the object of the present invention to avoid this disadvantage and to provide a piston for compressors which, despite partially leading the same out of the cylinder housing during a working stroke, can easily be introduced into the same again. Friction- and weight-reducing recesses are nevertheless provided on the piston skirt and a sufficient guidance of the piston is guaranteed.

This object is achieved in accordance with the invention by the characterizing features of claim 1.

As a result of the formation of several narrow, bridge-like sealing and guide surface sections which have the shape of a cylinder jacket surface sector and extend substantially in the direction of movement of the piston, the piston can be led to a larger part out of the cylinder in the zone of the lower dead centre and the projecting part can easily be introduced back into the cylinder, because sufficient sealing and guide surface sections are always sufficiently in contact with the cylinder wall during the entire process.

As a result of the merely narrow arrangement of the bridges it is possible to simultaneously noticeably reduce the friction in the system. Since one piston side is strained more strongly due to the rotational movement of the connecting rod, the cylinder-jacket-sector-like sealing and guide surface section can be provided with a stronger arrangement than the section which is situated in the less strained region of the piston.

The features of claims 2 and 3 ensure an optimal guidance in the direction of movement of the piston.

As a result of the characterizing features of claim 4 it is possible to adjust the height of the cylinder-jacket-sector-like sealing and guide surface sections precisely to the length which the piston projects out of cylinder at the lower dead centre.

As a result of the features of claim 5, said additional sealing and guide surface sections can be optimized further with respect to the frictional resistance and weight.

The feature of claim 14 describes a preferred embodiment of a piston in accordance with the invention.

The feature of claim 15 allows additionally reducing the friction and saving weight at the same time.

A detailed description of the invention and the state of the art is provided below by reference to the enclosed drawings, wherein:

FIG. 1 shows a piston according to the state of the art;

FIG. 2 shows an axonometric view of a piston in accordance with the invention;

FIG. 3 shows a further axonometric view of a piston in accordance with the invention;

FIG. 4 shows an axonometric view of a preferred embodiment of a piston in accordance with the invention;

FIG. 5 shows an axonometric view of a preferred embodiment of a piston in accordance with the invention;

FIG. 6 shows a top view of the piston in accordance with the invention;

FIG. 7 and FIG. 8 show an axonometric view of a further preferred embodiment of a piston in accordance with the invention.

FIG. 1 shows a piston for compressors according to the state of the art. Two cylinder-jacket-like sealing and guide surface sections 1a, 1b enclose an also cylinder-jacket-like recess 3. In the region of the recess 3 one can see the piston pin bore 4 as well as a bore 5 through which a positioning pin (not shown) can be inserted. It is used to fix the piston pin.

The height of the sealing and guide surface section 1a is chosen in such a way that a sufficient sealing is given with respect to the working medium (not shown). The height of the sealing and guide surface section 1b is merely very low in pistons according to the state of the art, so that when the piston is led out of the cylinder a slight tilting of the piston would occur at the lower dead centre until the cylinder wall edge touches the recess. The piston would therefore be stuck in an inclined fashion in the cylinder. During the subsequent upwards movement the sealing and guide surface section 1b could no longer be introduced into the cylinder because the edge of the sealing and guide surface section 1b would wedge with the cylinder wall edge.

FIGS. 2 and 3 show axonometric views of a piston in accordance with the invention which is made of sintered materials or a cast part. In addition to the cylinder-jacket-like sealing and guide surface section 2, there are two bridge-like sealing and guide surface sections 6 adjacent thereto which have the shape of a cylinder jacket surface sector, extend substantially parallel to the direction of movement of the piston and are enclosed by a recess 7. The piston pin bore 4 can be seen in the region of recess 7.

As is shown in FIGS. 4 and 5, a preferred embodiment provides that the bridge-like sealing and guide surface sections 6 having the shape of a cylinder jacket surface sector are merely provided with an arrangement of such a height that the piston is not unthreaded from the cylinder at the lower dead centre.

As a result of the sealing and guide surface sections 6 in accordance with the invention, a sufficient guidance of the piston in the cylinder is guaranteed, namely not only in cases when the piston does not move out of the cylinder at all, but even when the piston projects out of the cylinder up to half the entire piston height at the lower dead centre. At the same time, sufficient recesses can still be present in order to minimize the friction and the weight of the piston.

The width of the sealing and guide surface sections 6 in accordance with the invention are chosen in such a way that an oil film can be formed which is adequate for lubrication. According to FIG. 6, the angle α between the connecting lines of the boundary edges 9a, 9b of each bridge-like sealing and guide surface sections 6 having the shape of a cylinder jacket surface sector with the associated rotational axis 8 is smaller than 40°, preferably smaller than 30°. In this way said sealing and guide surface sections can be kept very small, thus reducing the friction and the weight of the piston, but still allowing a sufficient oil film to be formed between the sealing and guide surface sections 6 and the cylinder wall.

FIGS. 7 and 8 show a further preferred embodiment. The upper cylinder-jacket-like sealing and guide surface section 2 is subdivided by several oil grooves 12. However, in the lower region of the cylinder-jacket-like sealing and guide surface sections 6 in accordance with the invention a substantially circular-sector-like countersinking 13 is provided which further reduces the frictional resistance and additionally helps reduce weight.

What is claimed is:

1. A small-type refrigerating machine compressor piston which is free from a piston ring groove, with a cylinder-jacket-like sealing and guide surface section as well as at least two substantially bridge- and cylinder-jacket-sector-like sealing and guide surface sections of the piston skirt which have continuous surfaces, are flush with an upper face of the piston, and extend substantially parallel to the direction of movement of the piston occluding in a substantially sealing fashion with the cylinder wall and allowing the guidance of the piston in the cylinder as well as sealing the crankcase relative to the sealing or compression chamber and other sections of the piston skirt comprising a recess, as a result of which there is a distance between piston skirt and cylinder wall, wherein the angle (a) between the connecting lines of the boundary edges of each bridge-like and cylinder-jacket-sector-like sealing and guide surface section, which boundary edges extend in the axial direction of the piston, is smaller than 40°, with the associated rotational axis and the bridge- and cylinder-jacket-sector-like sealing and guide surface sections have different have different depths.

2. A piston as claimed in claim 1, wherein an end zone of a bridge- and cylinder-jacket-sector-like sealing and guide surface section is flush with the end of the piston closer to the crankcase.

3. A piston as claimed in claim 1, wherein one end zone each of a bridge- and cylinder-jacket-sector-like sealing and guide surface section converges into the cylinder-jacket-like sealing and guide surface section of the piston skirt.

4. A piston as claimed in claim 1, wherein the bridge- and cylinder-jacket-sector-like sealing and guide surface sections extend from the end of the piston closer to the crankcase in the direction towards the piston head over a length which corresponds at least to the length which the piston projects out of the cylinder housing at the lower dead center.

5. A piston as claimed in claim 1, wherein each bridge- and cylinder-jacket-sector-like sealing and guide surface section is interrupted by several point-like recesses.

6. A piston as claimed in claim 1, wherein the piston pin bore is arranged in the region of the recess.

7. A piston as claimed in claim 1, wherein in the end zone closer to the crankcase a recess is each arranged in the region of the cylinder-jacket-sector-like sealing and guide surface sections.

8. A piston as claimed in claim 1 wherein the angle is smaller than 30°.

* * * * *